US011145426B2

(12) United States Patent
Hamaya

(10) Patent No.: US 11,145,426 B2
(45) Date of Patent: Oct. 12, 2021

(54) INDEPENDENT PROCESS SIGNAL CONTROL AND MONITORING SYSTEM FOR A NUCLEAR REACTOR CONTAINMENT VESSEL

(71) Applicant: Mitsubishi Electric Corporation, Tokyo (JP)

(72) Inventor: Yoichiro Hamaya, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 78 days.

(21) Appl. No.: 16/490,692

(22) PCT Filed: Apr. 13, 2017

(86) PCT No.: PCT/JP2017/015143
§ 371 (c)(1),
(2) Date: Sep. 3, 2019

(87) PCT Pub. No.: WO2018/189865
PCT Pub. Date: Oct. 18, 2018

(65) Prior Publication Data
US 2020/0027597 A1    Jan. 23, 2020

(51) Int. Cl.
*G21D 3/00* (2006.01)
*G21C 17/00* (2006.01)
(Continued)

(52) U.S. Cl.
CPC .............. *G21D 3/001* (2013.01); *G21C 17/00* (2013.01); *G21C 17/002* (2013.01); *G21D 3/04* (2013.01); *G21D 3/06* (2013.01)

(58) Field of Classification Search
CPC .... G21C 17/00; G21C 17/002; G21C 17/003; G21C 17/007; G21C 17/01; G21C 17/02;
(Continued)

(56) References Cited

U.S. PATENT DOCUMENTS

2011/0161051 A1    6/2011  Vander Linden et al.
2011/0191064 A1    8/2011  Fukai
(Continued)

FOREIGN PATENT DOCUMENTS

JP    2002023832 A    1/2002
JP    2008309748 A    12/2008
(Continued)

OTHER PUBLICATIONS

International Search Report (PCT/ISA/210) dated Jul. 18, 2017, by the Japan Patent Office as the International Searching Authority for International Application No. PCT/JP2017/015143.

*Primary Examiner* — Darlene M Ritchie
(74) *Attorney, Agent, or Firm* — Buchanan Ingersoll & Rooney PC

(57) ABSTRACT

A process signal control and monitoring system, includes: a signal processing device which is installed on an outside of a nuclear reactor containment vessel, an internal electrical power source, an analog-digital conversion part, an internal communication part which transmits the digital signal to the signal processing device, an internal repeater, and an external repeater which transmits the received signal to a communication satellite. When electric power supply from the signal processing device is disconnected, the internal electrical power source supplies electric power which is charged in the rechargeable battery, to the analog-digital conversion part and the internal communication part; and the internal communication part judges whether communication with the signal processing device is continued or disconnected; and when the communication is judged to be continued, the internal communication part continues transmitting the digital signal to the signal processing device.

8 Claims, 11 Drawing Sheets

(51) Int. Cl.
   *G21D 3/04*      (2006.01)
   *G21D 3/06*      (2006.01)
(58) Field of Classification Search
   CPC .. G21C 17/021; G21C 17/022; G21C 17/025;
            G21C 17/0255; G21C 17/032; G21C
            17/035; G21C 17/038; G21C 17/044;
            G21C 17/047; G21C 17/06; G21C
         17/063; G21D 3/04; G21D 3/06; G21D
            3/08; G21D 3/10; G21D 3/12; G21D
            3/14; G21D 3/16; G21D 3/18; G21D
            3/001; Y02E 30/00; Y02E 30/30; G05B
               19/042; H02J 2207/10; H02J 7/00
   See application file for complete search history.

(56) References Cited

U.S. PATENT DOCUMENTS

| | | | |
|---|---|---|---|
| 2013/0083879 A1* | 4/2013 | Heibel | G21C 17/102 |
| | | | 376/153 |
| 2013/0272469 A1 | 10/2013 | Loewen et al. | |
| 2014/0001863 A1* | 1/2014 | Zhang | G21D 1/02 |
| | | | 307/66 |
| 2020/0027597 A1* | 1/2020 | Hamaya | G21C 17/00 |

FOREIGN PATENT DOCUMENTS

| | | | |
|---|---|---|---|
| JP | 2011524014 A | | 8/2011 |
| JP | 2012233705 A | * | 11/2012 |
| JP | 2013217923 A | | 10/2013 |
| JP | 2014002490 A | * | 1/2014 |
| WO | 2010038794 A1 | | 4/2010 |

* cited by examiner

INDEPENDENT PROCESS SIGNAL CONTROL AND MONITORING SYSTEM FOR A NUCLEAR REACTOR CONTAINMENT VESSEL

FIELD OF THE INVENTION

The present application relates to a process signal control and monitoring system, and more particularly, relates to a process signal control and monitoring system which receives process signals concerning a nuclear power plant, and transmits these received process signals toward the outside.

BACKGROUND OF THE INVENTION

Process signals of a nuclear power plant and the like will be inputted into a process signal input device of a process signal control and monitoring system (for example, refer to Patent Documents 1 to 5). The process signal input device is attached with a sensor and a transmitter and others, in order to measure process signals. The process signal input device which is widely used now converts analog signals from a sensor or a transmitter, such as a pressure, a temperature, and a flow rate, once into digital signals.

Moreover, the process signal input device transmits these digital signals to a signal processing device (a computing mechanism) of a plant control and monitoring unit. Further, the process signal input device provides electricity to the sensor and the transmitter and others, using the electric power which is obtained from the outside (a signal processing device).

CITATION LIST

Patent Literature

Patent Document 1: JP 2013-217923 A
Patent Document 2: JP 2002-023832 A
Patent Document 3: JP 2008-309748 A
Patent Document 4: JP 2011-524014 A
Patent Document 5: WO 2010/038794 A1

SUMMARY OF THE INVENTION

Technical Problem

The process signal input device of the process signal control and monitoring system concerning a nuclear power plant is constructed, as mentioned above. If an assumption is made that an accident occurs in a nuclear power plant, it will be probable that the process signal input device may lose the connection with an external power source. In a case where the external power source is lost, it will become impossible to monitor the process signals of the nuclear power plant with such a process signal input device, and the operator cannot perform an appropriate judgment.

The present application is made to solve the above mentioned subject in the process signal control and monitoring system, and aims at obtaining a process signal control and monitoring system which is capable of monitoring the process signals which a plant transmits, in order to attain the improvement in the safety of a nuclear power plant, even in a case where the external power source is lost.

Solution to Problem

A process signal control and monitoring system, according to the present application includes: a signal processing device which is installed on an outside of a nuclear reactor containment vessel, an internal electrical power source which charges a rechargeable battery with electric power, supplied from the signal processing device, an analog-digital conversion part which converts an analog signal into a digital signal, the analog signal transmitted from a sensor which is installed on an inside of the nuclear reactor containment vessel, an internal communication part which transmits the digital signal, converted in the analog-digital conversion part, to the signal processing device, an internal repeater which is installed on an inside of the nuclear reactor containment vessel, and an external repeater which is installed on the outside of the nuclear reactor containment vessel and when receiving a signal from the internal repeater, transmits the received signal to a communication satellite, wherein when electric power supply from the signal processing device is disconnected, the internal electrical power source supplies electric power which is charged in the rechargeable battery, to the analog-digital conversion part and the internal communication part; and the internal communication part judges whether communication with the signal processing device is continued or disconnected; and when the communication is judged to be continued, the internal communication part continues transmitting the digital signal which is converted in the analog-digital conversion part, to the signal processing device.

Advantageous Effects of Invention

A process signal control and monitoring system, according to the present application includes: a signal processing device which is installed on an outside of a nuclear reactor containment vessel, an internal electrical power source which charges a rechargeable battery with electric power, supplied from the signal processing device, an analog-digital conversion part which converts an analog signal into a digital signal, the analog signal transmitted from a sensor which is installed on an inside of the nuclear reactor containment vessel, an internal communication part which transmits the digital signal, converted in the analog-digital conversion part, to the signal processing device, an internal repeater which is installed on an inside of the nuclear reactor containment vessel, and an external repeater which is installed on the outside of the nuclear reactor containment vessel and when receiving a signal from the internal repeater, transmits the received signal to a communication satellite, wherein, when electric power supply from the signal processing device is disconnected, the internal electrical power source supplies electric power which is charged in the rechargeable battery, to the analog-digital conversion part and the internal communication part; and the internal communication part judges whether communication with the signal processing device is continued or disconnected; and when the communication is judged to be continued, the internal communication part continues transmitting the digital signal which is converted in the analog-digital conversion part, to the signal processing device. Then, also in the case where an external power source is lost, it will become possible to monitor the process signals of a nuclear power plant. Thereby, improvement in the safety of the nuclear power plant can be attained.

DETAILED DESCRIPTION OF THE INVENTION

Figure 1:
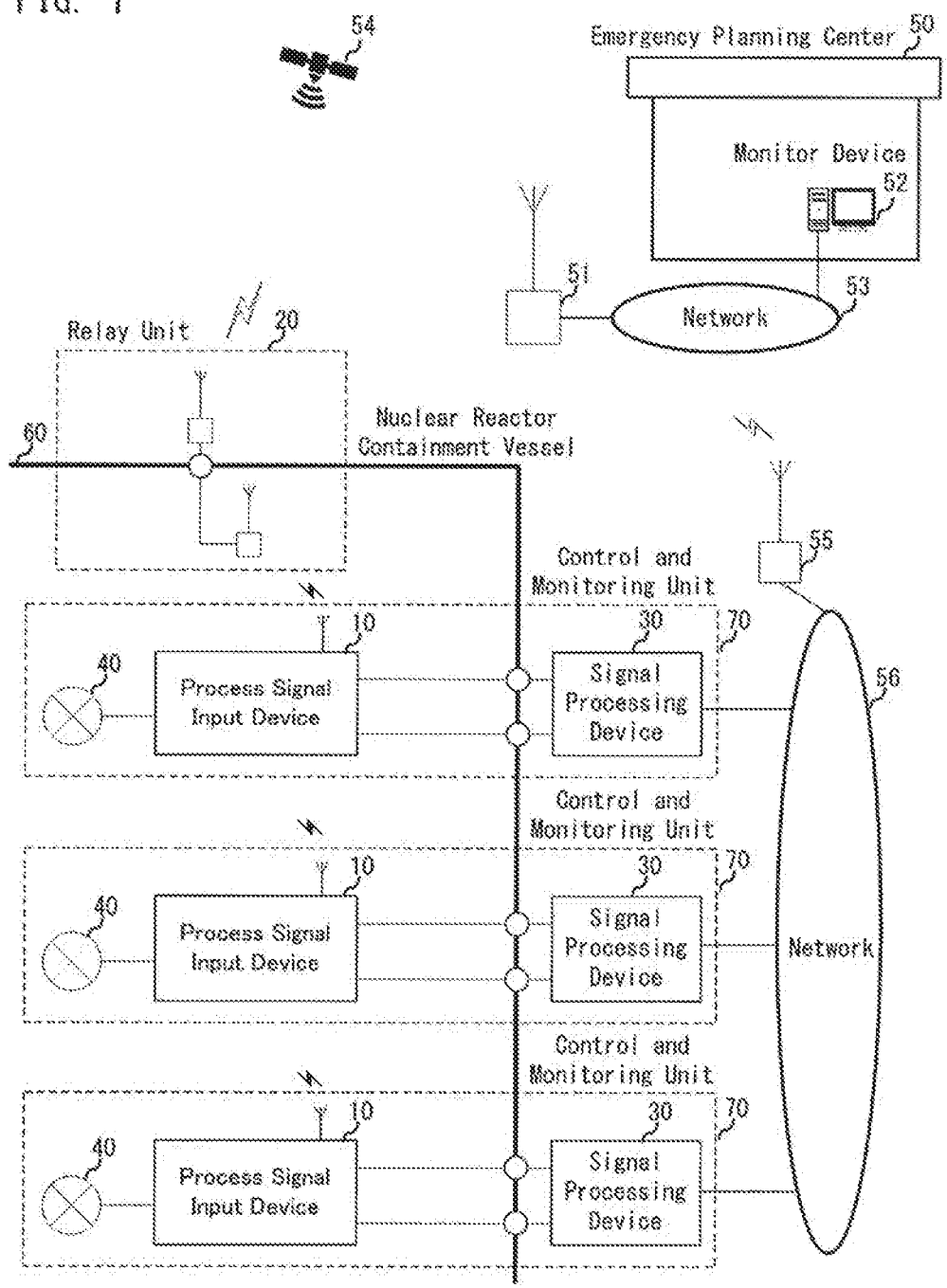
FIG. 1 is an overall configuration view for illustrating the relationship between an emergency planning center and a process signal control and monitoring system according to Embodiment 1 of the present invention.

Hereinafter, a process signal control and monitoring system according to the embodiments of the present invention will be described with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may be different among sectional views in which a part of the configuration is changed. Furthermore, although the configurations of the process signal control and monitoring system are further actually provided with a plurality of members, for ease of explanation, only portions necessary for explanation will be described and other portions are omitted.

Embodiment 1

Hereinafter, explanations about the embodiments of the present invention will be provided, based on drawings. FIG. 1 illustrates the configurations of an emergency planning center and a nuclear reactor containment vessel in the nuclear power plant schematically. The emergency planning center 50 of the nuclear power plant is installed on the outside of the nuclear reactor containment vessel 60. On the inside of the emergency planning center 50, the monitor device 52 of the nuclear power plant is arranged. The network 53 (the first network) of the emergency planning center 50 is connected with a wireless communication device 51 and a monitor device 52. The wireless communication device 51 is capable of obtaining information from a relay unit 20 via a communication satellite 54.

The relay unit 20 and a plurality of control and monitoring units 70 are installed in the nuclear reactor containment vessel 60. Each of the control and monitoring units 70 is composed of a signal processing device 30, a process signal input device 10, and a sensor 40. The sensor 40 and the process signal input device 10 are installed on the inside of the nuclear reactor containment vessel 60. The signal processing device 30 is installed on the outside of the nuclear reactor containment vessel 60. The signal processing device 30 is connected to the network 56 (the second network), which is disposed on the outside of the nuclear reactor containment vessel 60.

Figure 3:
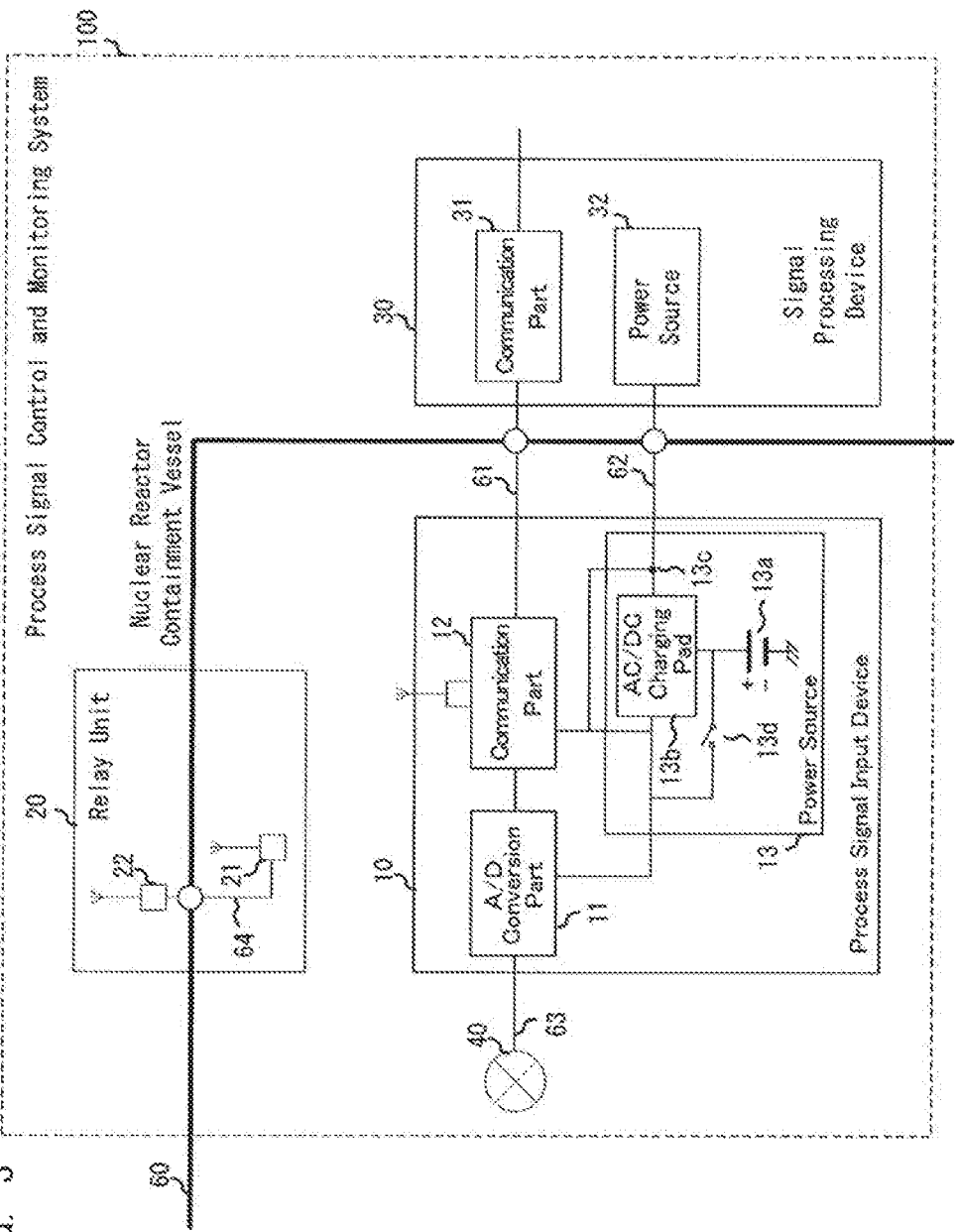
FIG. 3 is an overall view for illustrating the configuration of a process signal control and monitoring system according to Embodiment 1 of the present invention.

The nuclear reactor containment vessel 60 is provided with a process signal control and monitoring system, in order to transmit the process signals in relation to a nuclear power plant toward the outside (refer to FIG. 3). The sensor 40 is installed on the inside of the nuclear reactor containment vessel 60, and obtains process information, such as a pressure, a temperature, and a flow rate. The process signals (analog signals, such as a pressure, a temperature, and a flow rate), which the sensor 40 has obtained, will be transmitted to the process signal input device 10. The process signal input device 10 transmits the received process signal to the signal processing device 30, which is installed on the outside of the nuclear reactor containment vessel 60.

The network 56 has connection with a wireless communication device 55. In times of peace, the control and monitoring unit 70 (the process signal input device 10) is communicating with the wireless communication device 51 by way of the wireless communication device 55. The control and monitoring unit 70 can transmit process information to the relay unit 20, in an urgent moment. When the process information is transmitted to the relay unit 20 from the process signal input device 10, the relay unit 20 transmits the received process information to the emergency planning center 50 (the monitor device 52), which is installed on the outside of the nuclear power plant, by way of the wireless communication device 51 and the network 53, by the satellite based communication via the communication satellite 54.

Figure 2:
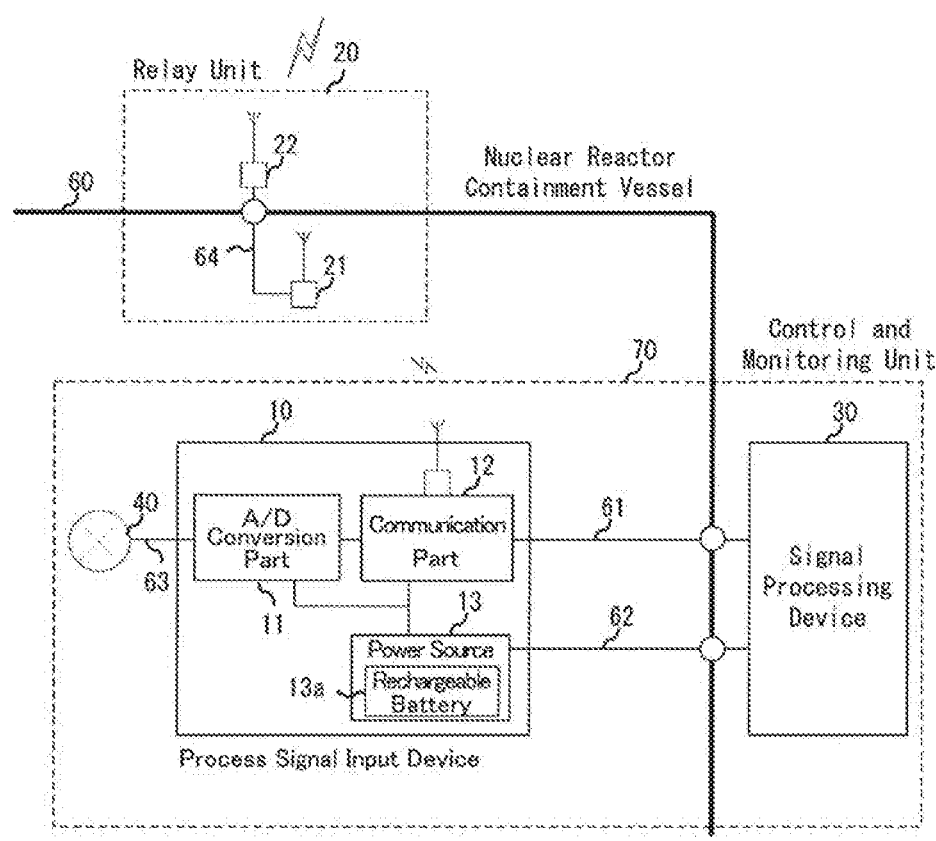
FIG. 2 is a configuration diagram for illustrating the outline of a control and monitoring unit according to Embodiment 1 of the present invention.

FIG. 2 illustrates a configuration of the process signal input device 10 and the relay unit 20. The control and monitoring unit 70 is composed of a signal processing device 30, a process signal input device 10, and a sensor 40. The process signal input device 10 is composed of an analog-digital (A/D) conversion part 11, an internal communication part 12, an internal electrical power source 13, and the like. The process signal input device 10 is connected with the signal processing device 30 which is installed on the outside of the nuclear reactor containment vessel 60, through a communication cable 61 and a power cable 62. The internal electrical power source 13 has a rechargeable battery (a storage battery) 13a, which is built in there. The analog-digital conversion part 11 performs A-D conversion of the process signal which is received from the sensor 40.

The internal electrical power source 13 is supplied with electric power from the signal processing device 30 via the power cable 62. The sensor 40 is connected with the process signal input device 10 through the signal wire 63. The sensor 40 includes a transmitter, a pressure gauge, a thermometer, a flowmeter, and so forth. The sensor 40 obtains process signals of analogue state, and the process signals are transmitted to the process signal input device 10 (the analog-digital conversion part 11) via the signal wire 63. The relay unit 20 is composed of an internal repeater 21, an external repeater 22, and others.

The internal repeater 21 and the external repeater 22 are connected with a communication cable 64. The internal repeater 21 is installed on the inside of the nuclear reactor containment vessel 60. The external repeater 22 is installed on the outside of the nuclear reactor containment vessel 60. The internal communication part 12 of the process signal input device 10 has a function for communicating with the signal processing device 30 through a communication cable 61, and a function for communicating with the wireless communication device 51 through a wireless communication device 55 (the toward the outside transmission equipment). The wireless communication device 51 is capable of communicating, by the network 53, with the emergency planning center 50 which is located on the outside of a nuclear power plant.

FIG. 3 illustrates a configuration of the process signal control and monitoring system. The process signal control and monitoring system 100 is composed of a relay unit 20, a process signal input device 10, and a signal processing device 30. The signal processing device 30 is provided with an external communication part 31 and an external power source 32. The external communication part 31 of the signal processing device 30 is connected with the internal communication part 12 of the process signal input device 10, and transmits a signal to the network 56. The internal electrical power source 13 of the process signal input device 10 includes a rechargeable battery (a storage battery) 13a and an AC/DC charging pad 13b, which are built in there.

Under normal circumstances, the AC/DC charging pad 13b of the internal electrical power source 13 charges the rechargeable battery 13a with the electric power which is supplied from the external power source 32 of the signal processing device 30, via the power cable 62. In a case where electric power feeding from the signal processing device 30 is disconnected, the internal electrical power source 13 can maintain the function to feed electric power to the analog-digital (A/D) conversion part 11 and the internal communication part 12, by the built in rechargeable battery 13a, for a definite period of time. The AC/DC charging pad 13b supplies electric power to the process signal input device 10, and in addition, charges an internal rechargeable battery (a storage battery) 13a.

The internal communication part 12 or the internal electrical power source 13 detects an input side voltage 13c of the AC/DC charging pad 13b, on a steady basis. If the input side voltage 13c of the AC/DC charging pad 13b becomes lower than a default value, the internal electrical power source 13 or the internal communication part 12 will judge that inconvenience is generated in the power feeding from the signal processing device 30, that is to say, that electric power feeding is lost. If the electric power feeding is lost and an emergency operational mode is employed, the internal electrical power source 13 will turn a switch 13d to a ON state and will start power feeding from the rechargeable battery (a storage battery) 13a to the analog-digital (A/D) conversion part 11 and the internal communication part 12.

Figure 4:
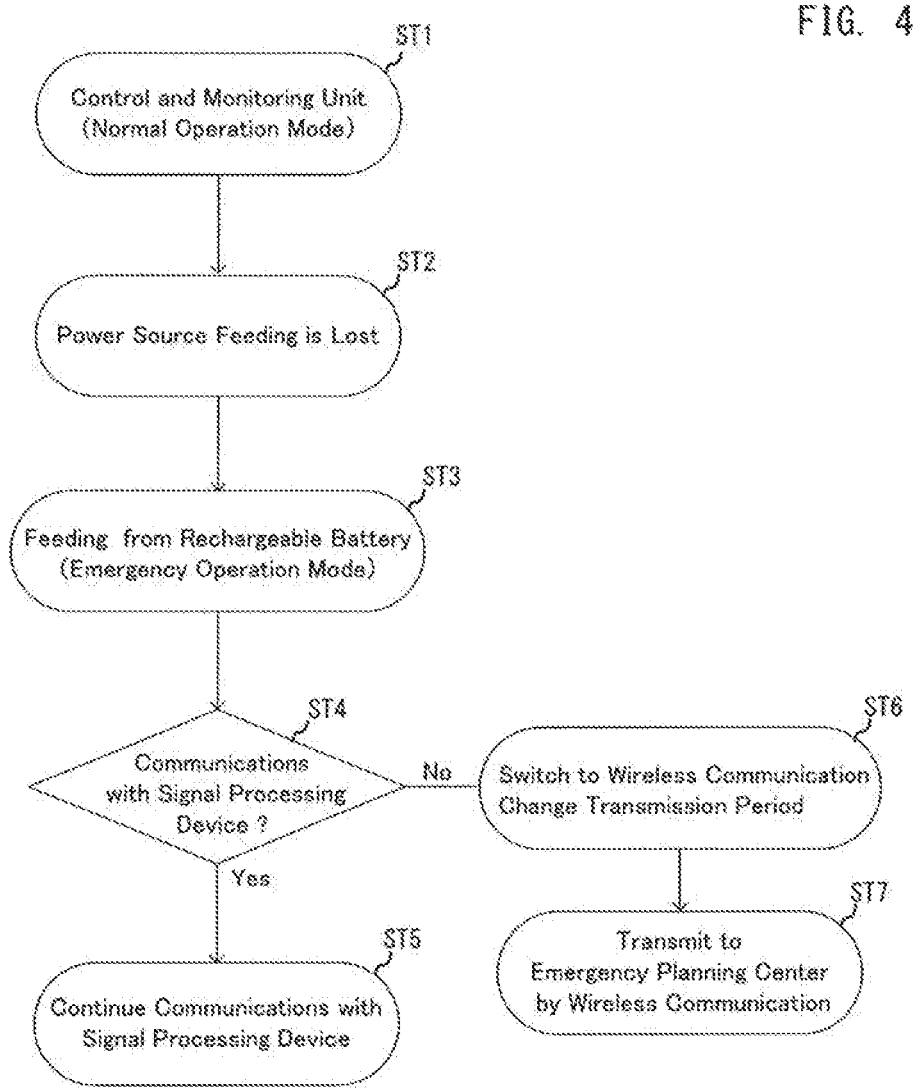
FIG. 4 is a flow diagram which shows operations of the process signal control and monitoring system according to Embodiment 1 of the present invention.

Next, with reference to FIG. 4, explanation will be made about the operation of the process signal control and monitoring system 100. The process signal control and monitoring system 100 differs in the operation mode (a normal operation mode and an emergency operation mode), depending on the power supply state of the internal electrical power source 13. First, explanation will be made about the normal operation mode. The process signal control and monitoring system 100 performs, at a tranquil time, the normal operation mode (Step 1). In the normal operation mode, electric power is supplied to the internal electrical power source 13 of the process signal input device 10 from the external power source 32 of the signal processing device 30, through the power cable 62.

In the normal operation mode, the process signal input device 10 operates with electric power which is supplied from the power cable 62. The internal communication part 12 of the process signal input device 10 transmits process signals to the signal processing device 30, through the communication cable 61. The signal processing device 30 is connected with other control and monitoring units, by the network 56. Process signals which are measured in the control and monitoring unit 70 are transmitted to the emergency planning center 50, which is located on the outside of the nuclear power plant, by the toward the outside transmission equipment (the wireless communication device 55).

Next, explanation will be made about the emergency operation mode. In the emergency operation mode, the electric power feeding from the signal processing device 30 to the process signal input device 10 is lost (Step 2), and feeding of the electricity starts from the rechargeable battery 13a of the internal electrical power source 13 (Step 3) to the process signal input device 10 (the internal communication part 12) and the sensor 40. When the electric power feeding from the signal processing device 30 to the internal electrical power source 13 is lost, the internal communication part 12 judges the operating state of the signal processing device 30, with the communication cable 61. That is to say, the internal communication part 12 checks whether the electric power feeding to the process signal input device 10 is only stopped or the operation of the signal processing device 30 is still continued (Step 4).

In a case where the internal communication part 12 judges that the communication facility of the signal processing device 30 is operating normally, and only the feeding function to the process signal input device 10 is stopped, the process signal input device 10 operates with the electric power feeding from the rechargeable battery 13a of the internal electrical power source 13. The internal communication part 12 continues the communication with the signal processing device 30 through the communication cable 61 (Step 5). In a case where the internal communication part 12 judges that not only the electric power feeding to the process signal input device 10 but also the operation of the signal processing device 30 is stopped, the internal communication part 12 switches to an emergency communication operation mode in which process signals are transmitted to the emergency planning center 50 by the wireless communication (Step 6).

The process signal input device 10 operates with the electric power feeding from the rechargeable battery 13a of the internal electrical power source 13. That is to say, the internal communication part 12 of the process signal input device 10 transmits process signals to the internal repeater 21 of the relay unit 20, in the emergency communication operation mode. The internal repeater 21 transmits process signals to the external repeater 22 by the wire communication (the communication cable 64). Information which is transmitted to the external repeater 22 from the internal communication part 12 of the process signal input device 10 will be sent to the emergency planning center 50 (the wireless communication device 51), which is installed on the outside of the nuclear power plant, by the satellite based communication via a communication satellite 54 (Step 7).

Further, in a case where the internal communication part 12 judges the operational situation of the signal processing device 30 and the wire communication is switched to the wireless communication, the internal communication part 12 employs a transmission period longer than that of the time when process signals are transmitted to the signal processing device 30 by the wire communication, that is to say, the internal communication part 12 provides a transmission period which is made longer than the transmission period of the normal operation mode, in order to cut down the power consumption of the rechargeable battery 13a. In a case where the process signal input device 10 is installed on the inside of the nuclear reactor containment vessel 60, wireless signals which are transmitted from the process signal input device 10 are received at the internal repeater 21 which is disposed on the inside the nuclear reactor containment vessel 60.

The internal repeater 21 is connected with the external repeater 22 which is disposed on the outside of the nuclear reactor containment vessel 60, through the communication cable 64. The process signals which were transmitted from the external repeater 22 by the wireless communication will be sent to the emergency planning center 50, which is located on the outside of a nuclear power plant, by the satellite based communication, which is not influenced by the condition of a field, and the process signals can be utilized for the assessment of the situation of the power plant.

In other words, the process signal control and monitoring system, according to the present application includes: a signal processing device which is installed on an outside of a nuclear reactor containment vessel, an internal electrical power source which charges a rechargeable battery with electric power, supplied from the signal processing device, an analog-digital conversion part which converts an analog signal into a digital signal, the analog signal transmitted from a sensor which is installed on an inside of the nuclear reactor containment vessel, an internal communication part which transmits the digital signal, converted in the analog-digital conversion part, to the signal processing device, an internal repeater which is installed on an inside of the nuclear reactor containment vessel, and an external repeater which is installed on the outside of the nuclear reactor containment vessel and when receiving a signal from the internal repeater, transmits the received signal to a communication satellite, wherein, when electric power supply from the signal processing device is disconnected, the internal electrical power source supplies electric power which is charged in the rechargeable battery, to the analog-digital conversion part and the internal communication part; and the internal communication part judges whether communication with the signal processing device is continued or disconnected; and when the communication is judged to be continued, the internal communication part continues transmitting the digital signal which is converted in the analog-digital conversion part, to the signal processing device.

Further, in order to monitor the process signal, even in the case where an external power is lost, the process signal input device of the control and monitoring unit in accordance with the present application, is provided with a communication part which can change the operation mode according to the operating state of a signal processing device; and a power which has a rechargeable battery (a storage battery), in order to monitor the process signal, even in the case where the power on the outside is lost. According to the present application, it is possible to provide a dual use process signal input device; one process signal input device is used in normal times, and the other process signal input device is used in the case where an external power source is lost. Accordingly, an operation state can always be checked with high reliability and it becomes possible to attain the saving in the equipment.

Embodiment 2

In the interest of security, the emergency operation mode, in which measured data of a nuclear power plant are transmitted by the wireless communication, needs to be held to a minimum. According to Embodiment 1, the internal communication part 12, which judged the signal processing device 30 from the feeding condition of electric power and the state of communication, determined the operation mode. By adding the determination by the value of a monitored parameter, to the judgment condition to the emergency operation mode in which the wireless communication is used, a minimum turnover into the wireless communication operational mode can be provided.

Figure 5:
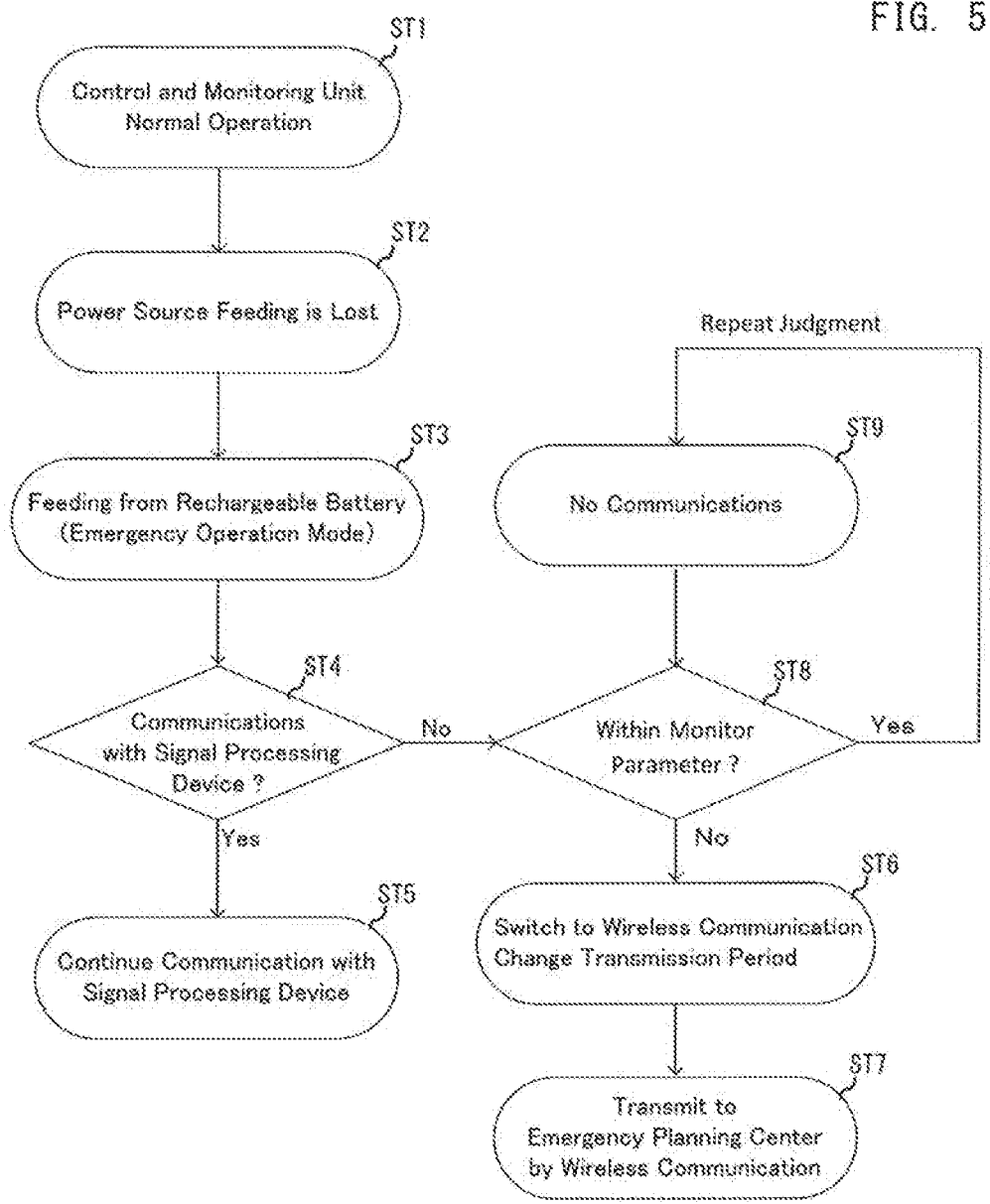
FIG. 5 is a flow diagram which shows operations of the process signal control and monitoring system according to Embodiment 2 of the present invention.

Next, with reference to FIG. 5, explanation will be made about the operation of a process signal control and monitoring system 100 in accordance with the present embodiment. The process signal control and monitoring system 100 differs in the operation mode (the normal operation mode and the emergency operation mode), depending on the feeding state of electric power of the internal electrical power source 13. First, explanation is made about a normal operation mode. The process signal control and monitoring system 100 performs the normal operation mode at a tranquil time (Step 1). In the normal operation mode, electric power is supplied from the external power source 32 of the signal processing device 30, to the internal electrical power source 13 of the process signal input device 10, through the power cable 62.

In the normal operation mode, the process signal input device 10 operates with the electric power which is supplied from the power cable 62. The internal communication part 12 of the process signal input device 10 transmits process signals to the signal processing device 30, through the communication cable 61. The signal processing device 30 is connected with other control and monitoring units, through the network 56. Process signals which are measured in the control and monitoring unit 70 are transmitted to the emergency planning center 50 which is located on the outside of a nuclear power plant, by the toward the outside transmission equipment (the wireless communication device 55).

Next, explanation will be made about an emergency operation mode. In the emergency operation mode, the electric power feeding from the signal processing device 30 to the process signal input device 10 is lost (Step 2), and feeding of the electricity starts from the rechargeable battery 13a of the internal electrical power source 13 to the process signal input device 10 (the internal communication part 12) and the sensor 40 (Step 3). When the electric power feeding from the signal processing device 30 to the internal electrical power source 13 is lost, the internal communication part 12 judges the operating state of the signal processing device 30 with the communication cable 61. That is to say, the internal communication part 12 checks whether the electric power feeding to the process signal input device 10 is only stopped or the operation of the signal processing device 30 is still continued (Step 4).

In a case where the communication facility of the signal processing device 30 is operating normally and the internal communication part 12 judges that only the feeding function to the process signal input device 10 is stopped, the process signal input device 10 operates by the electric power which is supplied from the rechargeable battery 13a of the internal electrical power source 13. The internal communication part 12 continues the communication with the signal processing device 30, through the communication cable 61 (Step 5). In a case where the internal communication part 12 judges that not only the power supply to the process signal input device 10 but also the operation of the signal processing device 30 is stopped, the internal communication part 12 determines the value of a monitor parameter (Step 8). When the comparison of the monitor parameter with a set value is performed and the monitor parameter is within the range of the set value, no communication will be performed (Step 9). For example, an internal temperature of the nuclear reactor containment vessel 60 is adopted as the monitor parameter.

Because the determination in Step 8 is carried out repeatedly, the communication from the process signal input device 10 to the signal processing device 30 will not performed, as long as the monitor parameter falls within the range of the set value. When the comparison of the monitor parameter with the set value is performed and the monitor parameter is judged to be out of the range of the set value, the internal communication part 12 will switch to a mode in which the process signal is transmitted to the emergency planning center 50 by the wireless communication (Step 6). In this emergency communication operation mode, the process signal input device 10 operates by the electric power which is supplied from the rechargeable battery 13a of the internal electrical power source 13.

In the emergency communication operation mode, the internal communication part 12 of the process signal input device 10 transmits the process signal to the internal repeater 21 of the relay unit 20. The internal repeater 21 transmits the process signal to the external repeater 22 by the wire communication (the communication cable 64). Information which is transmitted to the external repeater 22 from the internal communication part 12 of the process signal input device 10, will be sent to the emergency planning center 50 (the wireless communication device 51), which is installed on the outside of the nuclear power plant, by the satellite based communication via the communication satellite 54 (Step 7).

As mentioned above, in the process signal control and monitoring system in accordance with the present embodiment, the internal communication part 12 does not determine the operation mode, by judging only from the feeding condition of electric power and the state of communication in the signal processing device 30; and adds the determination by the value of the monitored parameter to the referee condition to the operation mode of the wireless communication. Owing to these situations, the process signal control and monitoring system in accordance with the present embodiment can provide a more minimum turnover into the operation mode of the wireless communication.

Embodiment 3

The relay unit 20 and the internal communication part 12 in accordance with the present embodiment are provided with not only the function for transmitting process signals but also the function for receiving information from the outside. The wireless communication device 51 receives information from the relay unit 20 (the process signal input device 10) via the communication satellite 54, and in addition, transmits the information which is delivered from the emergency planning center 50 to the relay unit 20, by way of the communication satellite 54.

Figure 6:
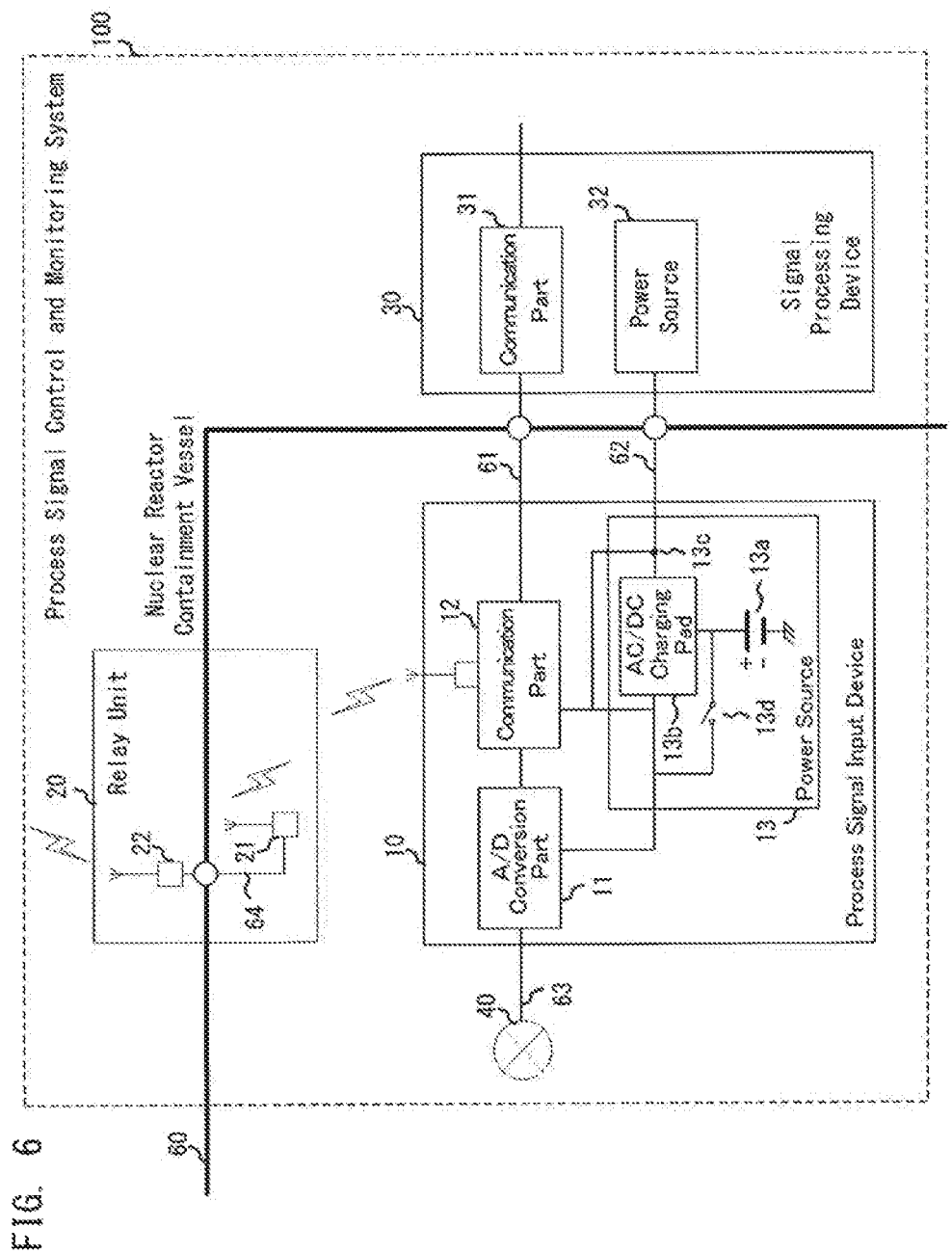
FIG. 6 is an overall view for illustrating the configuration of the process signal control and monitoring system according to Embodiment 3 of the present invention.

The nuclear reactor containment vessel 60 is provided with a process signal control and monitoring system 100, in order to transmit the process signal in relation to a nuclear power plant, toward the outside. FIG. 6 schematically illustrates a configuration of the process signal control and monitoring system 100 in accordance with the present embodiment. When the external repeater 22 receives a signal from the emergency planning center 50 through the satellite based communication, the internal repeater 21 will send the signal which the external repeater 22 received through the satellite based communication, toward the inside of the nuclear reactor containment vessel 60. On this account, the internal communication part 12 is capable of communicating bi-directionally with the emergency planning center 50 which is located on the outside of the nuclear power plant.

The sensor 40 is installed on the inside of the nuclear reactor containment vessel 60, and obtains process information, such as a pressure, a temperature, and a flow rate. Process signals (analog signals, such as a pressure, a temperature, and a flow rate), which the sensor 40 obtained, are transmitted to the process signal input device 10. The process signal input device 10 transmits the received process signals to the signal processing device 30 which is installed on the outside of the nuclear reactor containment vessel 60.

A relay unit 20 and a plurality of control and monitoring units 70 are installed in the nuclear reactor containment vessel 60. Each of the control and monitoring units 70 is composed of a signal processing device 30, a process signal input device 10, and a sensor 40. The sensor 40 and the process signal input device 10 are installed on the inside of the nuclear reactor containment vessel 60. The signal processing device 30 is installed on the outside of the nuclear reactor containment vessel 60. The signal processing device 30 is connected to the network 56 (the second network) which is allocated on the outside of the nuclear reactor containment vessel 60.

The network 56 is connected with a wireless communication device 55. In times of peace, the control and monitoring unit 70 (the process signal input device 10) is communicating with the wireless communication device 51 by way of the wireless communication device 55. The control and monitoring unit 70 can transmit process information to the relay unit 20 in an urgent moment. When process information is transmitted to the relay unit 20 from the process signal input device 10, the relay unit 20 will transmit the received process information to the emergency planning center 50 (the monitor device 52) which is installed on the outside of the nuclear power plant, by way of the wireless communication device 51 and the network 53, by the satellite based communication via the communication satellite 54.

The internal repeater 21 and the external repeater 22 are connected with the communication cable 64. The internal repeater 21 is installed on the inside of the nuclear reactor containment vessel 60. The external repeater 22 is installed on the outside of the nuclear reactor containment vessel 60. Even in the emergency operation mode, the internal communication part 12 of the process signal input device 10 can communicate, bi-directionally due to the relay unit 20, with the emergency planning center 50 which is on the outside of a nuclear power plant.

Figure 7:
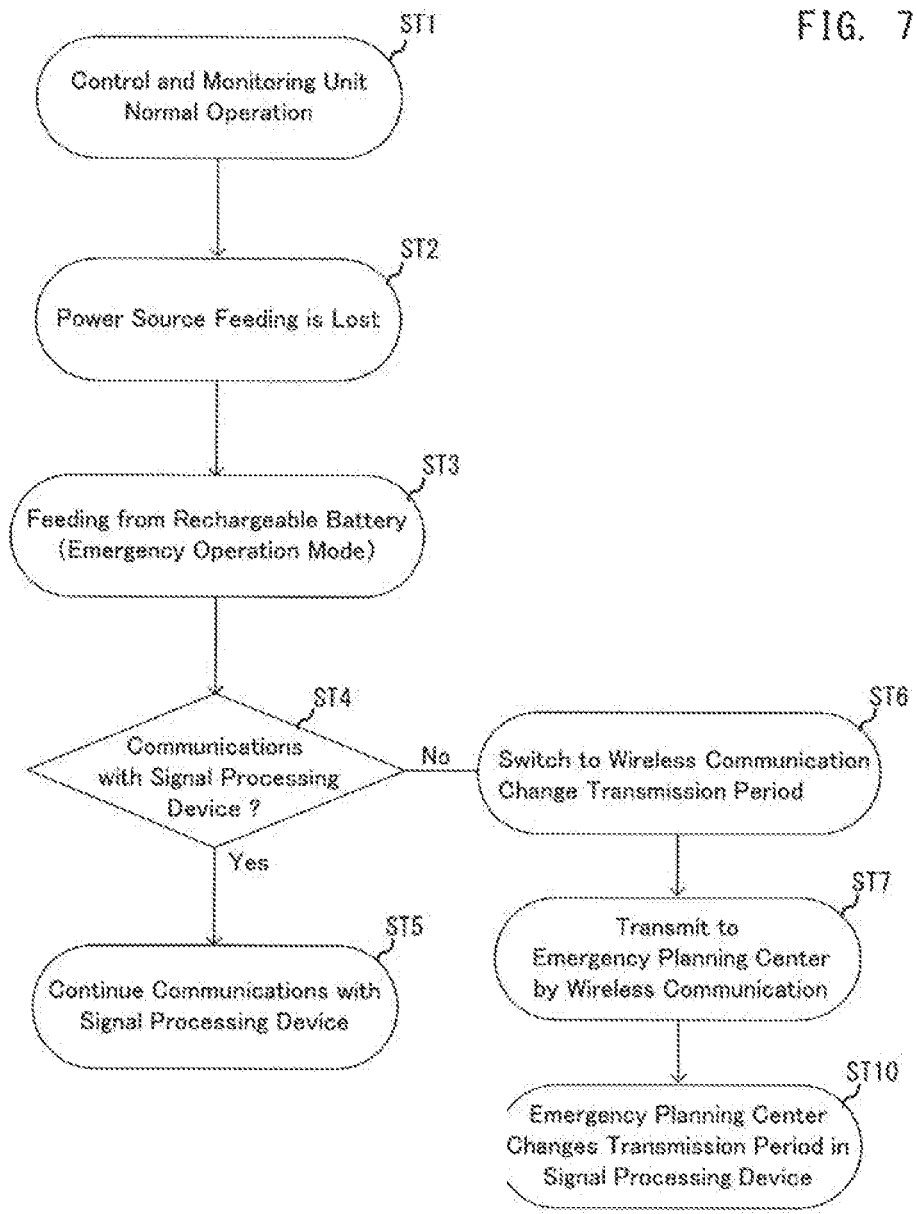
FIG. 7 is a flow diagram which shows operations of the process signal control and monitoring system according to Embodiment 3 of the present invention.

Next, with reference to FIG. 7, explanation will be made about the operation of the process signal control and monitoring system 100 in accordance with the present embodiment. The process signal control and monitoring system 100 differs in the operation mode (the normal operation mode and the emergency operation mode), depending on the supply state of the internal electrical power source 13. First, explanation will be made about the normal operation mode. At a tranquil time, the process signal control and monitoring system 100 performs the normal operation mode (Step 1). In the normal operation mode, electric power is supplied from the external power source 32 of the signal processing device 30 to the internal electrical power source 13 of the process signal input device 10, through the power cable 62.

In the normal operation mode, the process signal input device 10 operates with the electric power which is supplied from the power cable 62. The internal communication part 12 of the process signal input device 10 transmits the process signal to the signal processing device 30 through the communication cable 61. The signal processing device 30 is connected with other control and monitoring units, through the network 56. Process signals which are measured in the control and monitoring unit 70 are transmitted to the emergency planning center 50 which is on the outside of a nuclear power plant, by the toward the outside transmission equipment (the wireless communication device 55).

Next, explanation will be made about the emergency operation mode. In the emergency operation mode, the electric power feeding from the signal processing device 30 to the process signal input device 10 is lost (Step 2), and feeding of the electricity starts from the rechargeable battery 13a of the internal electrical power source 13 to the process signal input device 10 (the internal communication part 12) and the sensor 40 (Step 3). When the electric power feeding from the signal processing device 30 to the internal electrical power source 13 is lost, the internal communication part 12 judges the operating state of the signal processing device 30, with the communication cable 61. That is to say, the internal communication part 12 checks whether the electric power feeding to the process signal input device 10 is only disconnected or the operation of the signal processing device 30 is still continued (Step 4).

In a case where the internal communication part 12 judges that the communication facility of the signal processing device 30 is operating normally, and only the feeding function to the process signal input device 10 is stopped, the process signal input device 10 operates by the electric power which is supplied from the rechargeable battery 13a of the internal electrical power source 13. The internal communication part 12 continues the communication with the signal processing device 30, through the communication cable 61 (Step 5). In a case where the internal communication part 12 judges that not only the electric power supply to the process signal input device 10 but also the operation of the signal processing device 30 is stopped, the internal communication part 12 switches to a mode in which the process signal is transmitted to the emergency planning center 50 by the wireless communication (Step 6).

The process signal input device 10 operates by the electric power which is supplied from the rechargeable battery 13a of the internal electrical power source 13. That is to say, the internal communication part 12 of the process signal input device 10 transmits the process signal to the internal repeater 21 of the relay unit 20, in the emergency operation mode. The internal repeater 21 transmits the process signal to the external repeater 22 by the wire communication (the communication cable 64). Information which is transmitted to the external repeater 22 from the internal communication part 12 of the process signal input device 10 will be sent to the emergency planning center 50 (the wireless communication device 51) which is installed on the outside of the nuclear power plant, by the satellite based communication via the communication satellite 54 (Step 7).

Further, in order to reduce the power consumption in the rechargeable battery 13a, the emergency planning center 50 can issue an alteration command which makes a transmission period longer than that of the time when the process signal is transmitted to the signal processing device 30 by the wire communication. That is to say, the emergency planning center 50 gives a direction to the internal communication part 12 of the process signal input device 10 via the relay unit 20, so that a transmission period longer than the transmission period of the normal operation mode will be adopted. According to the direction from the emergency planning center 50, the internal communication part 12 provides a transmission period longer than the transmission period of the normal operation mode (Step 10).

As mentioned above, in the process signal control and monitoring system according to the present embodiment, the relay unit 20 and the internal communication part 12 are provided with not only the transmission function of the process signal but also the receiving function from the outside. Accordingly, the transmission period can be changed to a value other than the prearranged period. By providing a function to receive communications from the outside in the internal communication part 12 and the relay unit 20, the internal communication part 12 changes a transmission period, based on the direction from the external emergency planning center. Thereby, it is possible to attain a further power saving and to monitor for a long time even after the electric power is lost.

Embodiment 4

Figure 8:
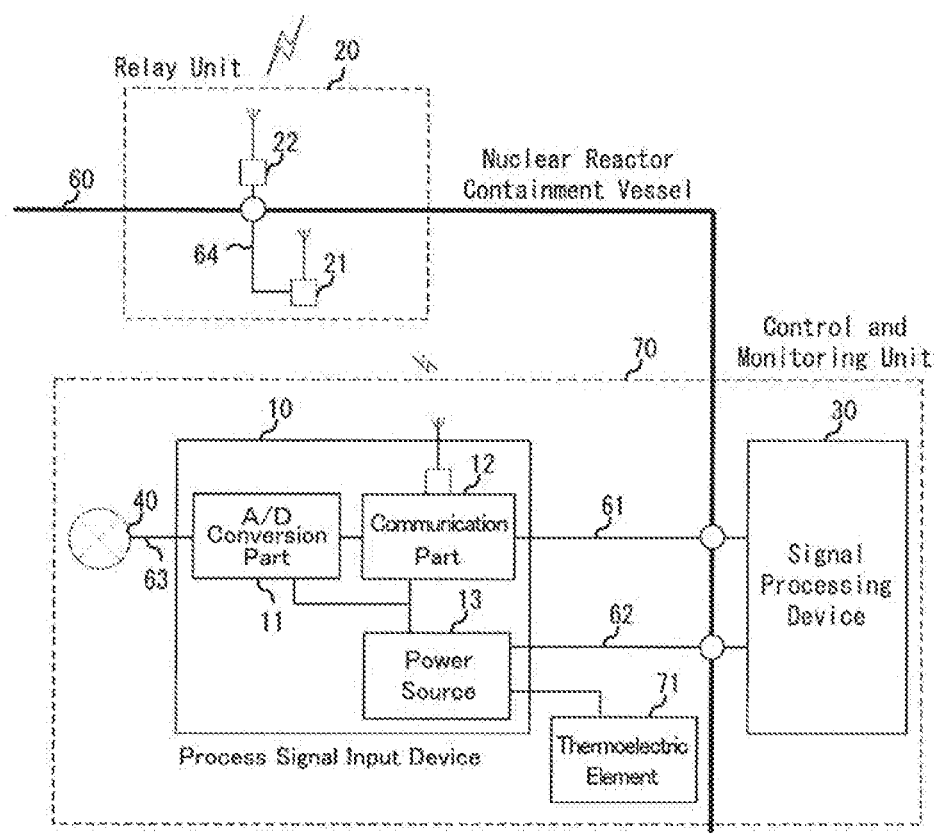
FIG. 8 is a configuration diagram which illustrates the outline of a control and monitoring unit according to Embodiment 4 of the present invention.

It is to be noted that the internal electrical power source 13 had a rechargeable battery (a storage battery) 13a on the inside, in Embodiment 1. Thermoelectric power generation, which uses the internal exhaust heat (temperature gradient in the piping) of the nuclear reactor containment vessel 60, is also available as the electric power of the process signal input device 10. FIG. 8 schematically illustrates a configuration of the process signal control and monitoring system 100 in accordance with the present embodiment. As shown in the drawing, the control and monitoring unit 70 (the process signal input device 10) in accordance with the present embodiment is provided with a thermoelectric element 71.

The control and monitoring unit 70 is composed of a signal processing device 30, a process signal input device 10, a sensor 40, a thermoelectric element 71, and so forth. The process signal input device 10 is composed of an analog-digital (A/D) conversion part 11, an internal communication part 12, an internal electrical power source 13, and so forth. The process signal input device 10 is connected with the signal processing device 30, which is installed on the outside of the nuclear reactor containment vessel 60, through the communication cable 61 and the power cable 62. The internal electrical power source 13 is provided with a built-in rechargeable battery, and in addition, is also connected with a thermoelectric element 71. The analog-digital conversion part 11 performs A-D conversion of a process signal which is received from the sensor 40.

In the normal operation mode, the internal electrical power source 13 receives electric power which is supplied from the signal processing device 30 via the power cable 62. The sensor 40 is connected with the process signal input device 10 through the signal wire 63. The sensor 40 includes a transmitter, a pressure gauge, a thermometer, a flowmeter, and so forth. The sensor 40 obtains process signals of analogue state, and the process signals are transmitted to the process signal input device 10 (the analog-digital conversion part 11) via the signal wire 63. The relay unit 20 is composed of the internal repeater 21, the external repeater 22, and others.

The internal repeater 21 and the external repeater 22 are connected with the communication cable 64. The internal repeater 21 is installed on the inside of the nuclear reactor containment vessel 60. The external repeater 22 is installed on the outside of the nuclear reactor containment vessel 60. The internal communication part 12 of the process signal input device 10 has a function to communicate with the signal processing device 30 through the communication cable 61, and a function to communicate with the wireless communication device 51 by way of the wireless communication device 55 (the toward the outside transmission equipment). The wireless communication device 51 is capable of communicating, by the network 53, with the emergency planning center 50 which is located on the outside of the nuclear power plant.

Under normal circumstances, the internal electrical power source 13 charges a rechargeable battery with the electric power which was supplied from the external power source 32 of the signal processing device 30, via the power cable 62. The internal electrical power source 13 can maintain the function to supply electric power to the analog-digital (A/D) conversion part 11 and the internal communication part 12, for a given length of time, by the built-in rechargeable battery 13a, in a case where electric power feeding from the signal processing device 30 is disconnected. The internal electrical power source 13 will change the vendor of electric power, from the rechargeable battery 13a to the thermoelectric element 71, when the electric power of the rechargeable battery 13a begins depleting.

Further, the internal electrical power source 13 stores the electric power which is supplied from this thermoelectric element 71 to the rechargeable battery 13a. It is to be noted that the internal electrical power source 13 will judge that the electric power of the rechargeable battery 13a is depleted, if the output side voltage of the rechargeable battery 13a becomes lower than a default value. Therefore, the process signal input device of the control and monitoring unit in accordance with the present invention is provided with an electric power source, such as a thermoelectric power generation, which can use the energy on the inside of the nuclear reactor containment vessel to generate electricity, in order to monitor the process signal, even in a case where the external electric power is lost.

Embodiment 5

Figure 9:
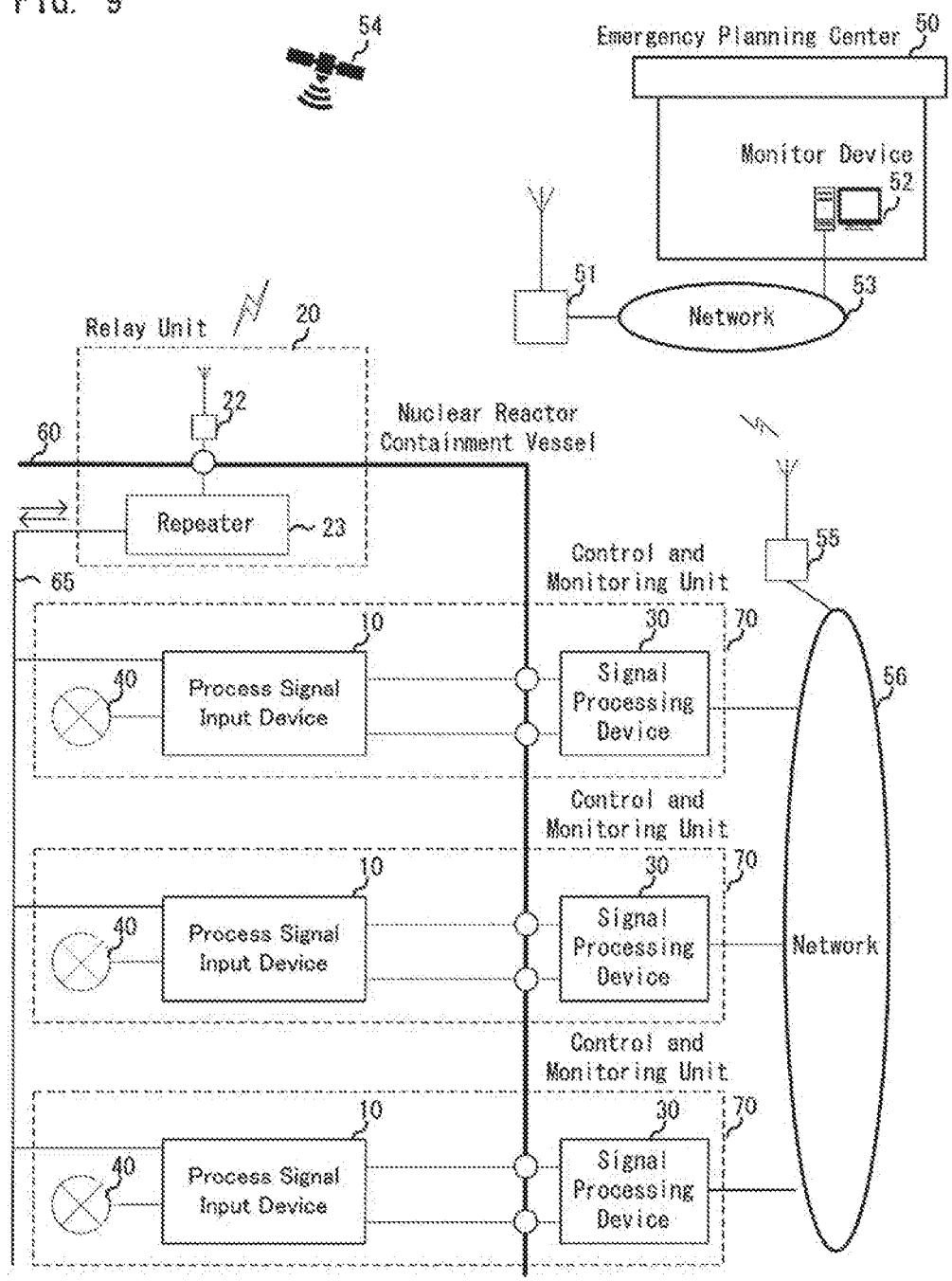
FIG. 9 is an overall configuration view for illustrating the relationship between an emergency planning center and a process signal control and monitoring system according to Embodiment 5 of the present invention.

According to Embodiment 1, the internal communication part 12 and the relay unit 20 performed wireless communications. It is also possible to use a communication cable for the communication between the internal communication part 12 and the relay unit 20, in order to improve the reliability. FIG. 9 schematically illustrates a configuration of the emergency planning center and the nuclear reactor containment vessel according to the present embodiment. The relay unit 20 is composed of an internal repeater 23 with the wire communication facility, an external repeater 22 with the wireless communication facility, and the like. The process signal input device 10 and the relay unit 20 are connected with the communication cable 65. As shown in the drawing, the internal repeater 23 which is provided with the wire communication facility communicates bi-directionally with all the process signal input devices 10 in the nuclear reactor containment vessel, in order to reduce the amount of wires which penetrate the nuclear reactor containment vessel 60.

The emergency planning center 50 of the nuclear power plant is installed on the outside of the nuclear reactor containment vessel 60. On the inside of the emergency planning center 50, the monitor device 52 of the nuclear power plant is disposed. The network 53 (the first network) of the emergency planning center 50 is connected with the wireless communication device 51 and the monitor device 52. The wireless communication device 51 can obtain information from the relay unit 20 via the communication satellite 54.

A relay unit 20 and a plurality of control and monitoring units 70 are installed in the nuclear reactor containment vessel 60. Each of the control and monitoring units 70 is composed of a signal processing device 30, a process signal input device 10, and a sensor 40. The sensor 40 and the process signal input device 10 are installed on the inside of the nuclear reactor containment vessel 60. The signal processing device 30 is installed on the outside of the nuclear reactor containment vessel 60. The signal processing device 30 is connected to the network 56 (the second network) which is allocated on the outside of the nuclear reactor containment vessel 60.

Figure 10:
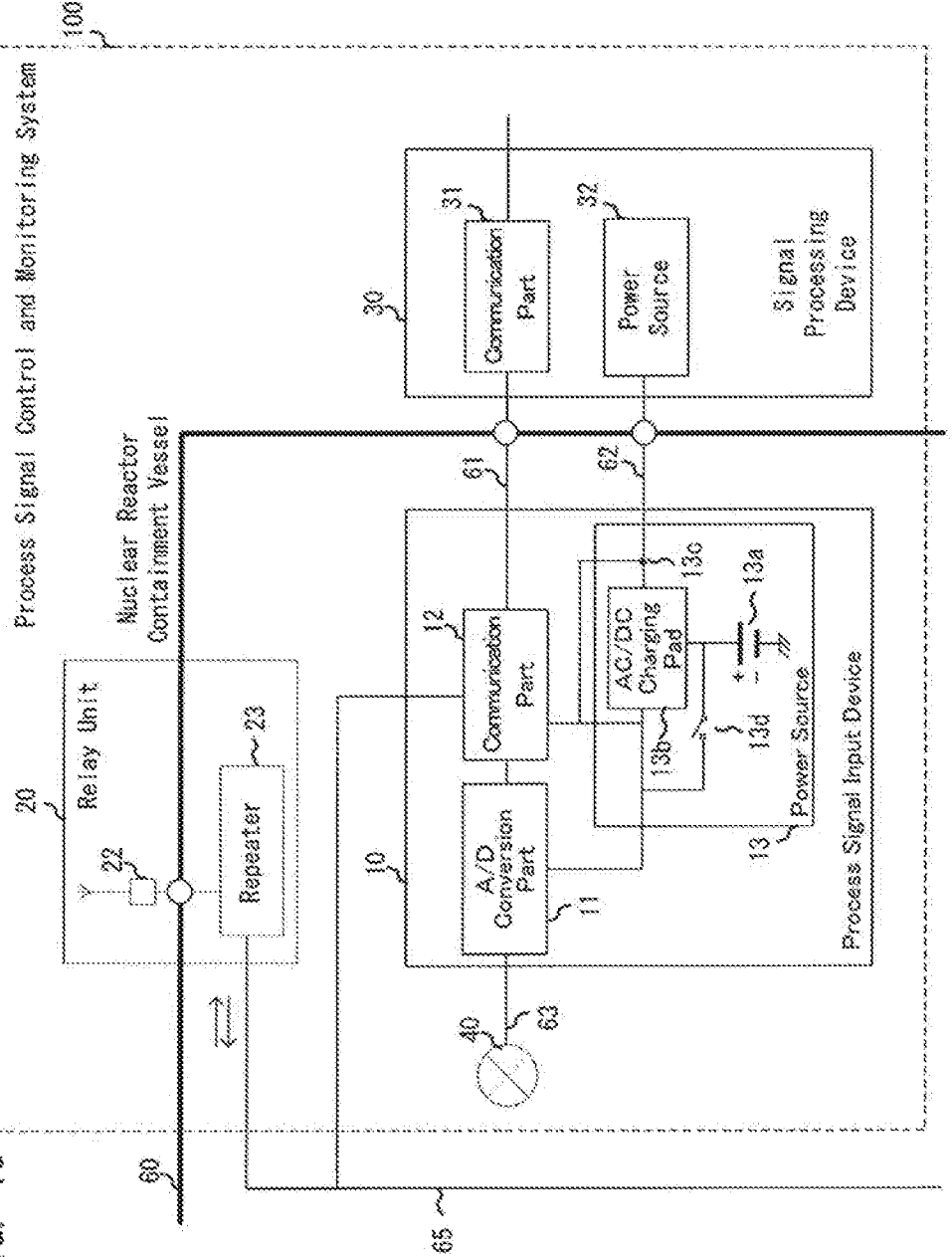
FIG. 10 is an overall view which illustrates the configuration of a process signal control and monitoring system according to Embodiment 5 of the present invention.

FIG. 10 illustrates a configuration of the process signal control and monitoring system in accordance with the present embodiment. The process signal control and monitoring system 100 is composed of a relay unit 20, a process signal input device 10, and a signal processing device 30. The sensor 40 is installed on the inside of the nuclear reactor containment vessel 60, and obtains process information, such as a pressure, a temperature, and a flow rate. Process signals (analog signals, such as a pressure, a temperature, and a flow rate), which the sensor 40 obtained, are transmitted to the process signal input device 10.

The process signal input device 10 transmits the received process signal to the signal processing device 30 which is installed on the outside of the nuclear reactor containment vessel 60. The wireless communication device 55 is connected to the network 56. In times of peace, the control and monitoring unit 70 (the process signal input device 10) communicates with the wireless communication device 51 by way of the wireless communication device 55. In an urgent moment, the control and monitoring unit 70 can communicate information bi-directionally with the emergency planning center 50 via the internal repeater 23 of the relay unit 20.

When process information is transmitted to the relay unit 20 from the process signal input device 10 through the communication cable 65, the relay unit 20 transmits the received process information to the emergency planning center 50 (the monitor device 52) which is installed on the outside of the nuclear power plant, by way of the wireless communication device 51 and the network 53, by the satellite based communication via the communication satellite 54. That is to say, the process signal input device of the control and monitoring unit in accordance with the present invention is provided with a relay unit, which relays wireless communications within a nuclear reactor containment vessel through a communication cable toward the outside of the nuclear reactor containment vessel, and communicates toward the outside of the containment vessel, by the satellite based communication.

Further, there are provided with a process signal input device and a relay unit which can change a transmission period in the wireless communication of the process signal, by the communication from the outside. Further, in order to monitor a process signal even in a case where an external electric power supply is lost, there is provided with a communication part of the control and monitoring unit which can change an operation mode, depending on the operating state of a signal processing device and the value of a measuring process signal.

Figure 11:
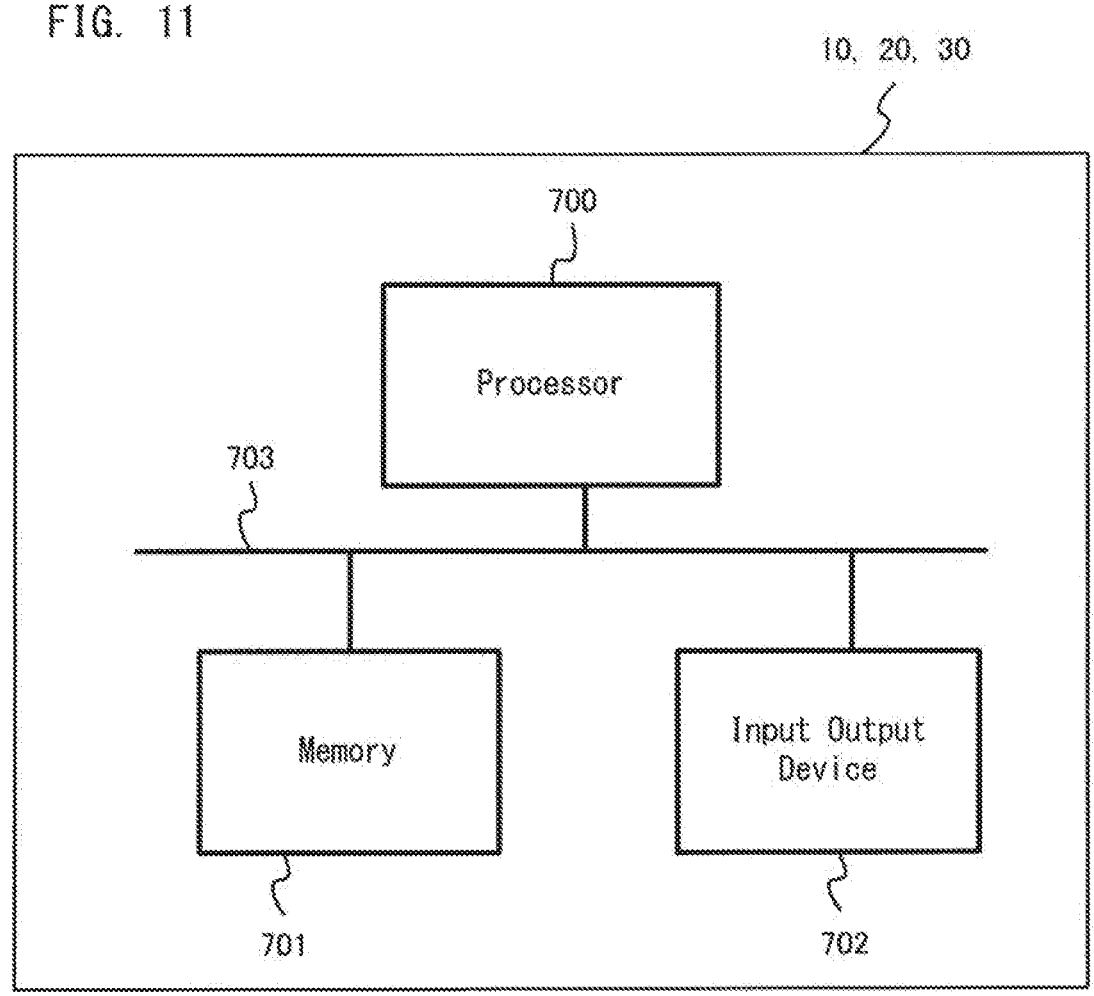
FIG. 11 is an illustration of the hardware constitution for realizing functional blocks in accordance with the Embodiments of the present application.

Note that, in the present invention, each of the embodiments can be freely combined, appropriately modified and/or eliminated without departing from the scope of the invention. Further, it is also to be noted that each of the functional blocks, which are shown in FIG. 1, FIG. 2, FIG. 3, FIG. 6, FIG. 8, FIG. 9, and FIG. 10, is realized by the hardware which is shown in FIG. 11, where the hardware blocks include a process signal input device 10 (an analog-digital conversion part 11, an internal communication part 12, and an internal electrical power source 13), a relay unit 20 (an internal repeater 21, an external repeater 22, and an internal repeater 23), a signal processing device 30 (an external communication part 31 and an external power source 32), and so forth. That is to say, a processor 700, a memory 701 which stores a program and data, and an input output device 702, such as a sensor, are connected with data buses 703, and the processing of data and the transmission of data are controlled by the processor 700.

EXPLANATION OF NUMERALS AND SYMBOLS

10 Process signal input device: 11 Analog-digital conversion part: 12 Internal communication part: 13 Internal electrical power source: 13a Rechargeable battery: 13b Charging pad: 13c Input side voltage: 13d Switch: 20 Relay unit: 21 Internal repeater: 22 External repeater: 23 Internal repeater: 30 Signal processing device: 31 External communication part: 32 External power source: 40 Sensor: 50 Emergency planning center 51 Wireless communication device: 52 Monitor device: 53 Network: 54 Communication satellite: 55 Wireless communication device: 56 Network 60 Nuclear reactor containment vessel: 61 Communication cable: 62 Power cable: 63 Signal wire: 64 Communication cable: 65 Communication cable 70 Control and monitoring unit: 71 Thermoelectric element: 100 Process signal control and monitoring system

What is claimed is:

1. A process signal control and monitoring system, comprising:
a signal processing device which is installed on an outside of a nuclear reactor containment vessel,
an internal electrical power source which charges a rechargeable battery with electric power, supplied from the signal processing device,
an analog-digital converter which converts an analog signal into a digital signal, the analog signal transmitted from a sensor which is installed on an inside of the nuclear reactor containment vessel,
an internal communicator, comprising a processor, which transmits the digital signal, converted in the analog-digital converter, to the signal processing device,
an internal repeater which is installed on an inside of the nuclear reactor containment vessel, and
an external repeater which is installed on the outside of the nuclear reactor containment vessel and when receiving a signal from the internal repeater, transmits the received signal to a communication satellite,
wherein when electric power supply from the signal processing device is disconnected, the internal electrical power source supplies electric power, which is charged in the rechargeable battery, to the analog-digital converter and the internal communicator; and
the internal communicator judges, after the electric power supply from the signal processing device is disconnected, whether communication with the signal processing device is connected or disconnected; and
when the internal communicator judges that the communication with the signal processing device is connected, the internal communicator continues transmitting the digital signal, which is converted in the analog-digital converter, to the signal processing device.

2. The process signal control and monitoring system according to claim 1,
wherein a thermoelectric element installed on the inside of the nuclear reactor containment vessel is provided, and
the internal communicator operates with electric power which the thermoelectric element supplies.

3. The process signal control and monitoring system according to claim 1,
wherein when the internal communicator judges that the communication with the signal processing device is disconnected, the internal communicator transmits the digital signal, which is converted in the analog-digital converter, to the internal repeater.

4. The process signal control and monitoring system according to claim 3,
wherein the internal communicator transmits the digital signal, which is converted in the analog-digital converter, to the internal repeater by wire communication.

5. The process signal control and monitoring system according to claim 3,
wherein the internal communicator transmits the digital signal, which is converted in the analog-digital converter, to the internal repeater by wireless communication.

6. The process signal control and monitoring system according to claim 5,
wherein when the internal communicator transmits the digital signal, which is converted in the analog-digital converter, to the internal repeater by wireless communication, the internal communicator transmits the digital signal with a transmission period later than that of a normal operation time.

7. The process signal control and monitoring system according to claim 3,
wherein when the external repeater receives a signal from a communication satellite,
the internal repeater will transmit the signal which the external repeater received from the communication satellite.

8. The process signal control and monitoring system according to claim 7,
wherein when the internal communicator receives the signal which the internal repeater transmitted,
the internal communicator transmits to the internal communicator with a transmission period later than that of the normal operation time.

* * * * *